United States Patent [19]
Belshaw et al.

[11] Patent Number: 4,902,976
[45] Date of Patent: Feb. 20, 1990

[54] PROBE FOR DETECTING THE PRESENCE OF MAGNETIC MATERIAL IN A GROUND HOLE

[75] Inventors: Douglas J. Belshaw, Georgetown; Donald A. Toon, Burlington; Peter F. Kuryllowicz, Georgetown, all of Canada

[73] Assignee: Solinst Canada Limited, Georgetown, Canada

[21] Appl. No.: 211,441

[22] Filed: Jun. 24, 1988

[30] Foreign Application Priority Data

Jun. 27, 1987 [GB] United Kingdom ............... 8715118

[51] Int. Cl.$^4$ .................. G01V 3/00; G01V 3/08; G01V 3/18; G01N 27/72
[52] U.S. Cl. ................... 324/346; 324/221; 166/66.5
[58] Field of Search .................. 324/219–221, 324/346, 67, 228, 235; 335/205, 207; 340/686; 166/65 M

[56] References Cited

U.S. PATENT DOCUMENTS 2,749,663 6/1956 Lemelson ............... 324/228
4,219,773 8/1980 Markfelt ............... 324/221

FOREIGN PATENT DOCUMENTS 1602687 11/1981 United Kingdom .

Primary Examiner—Gerard R. Strecker
Assistant Examiner—Walter E. Snow
Attorney, Agent, or Firm—Anthony Asquith & Co.

[57] ABSTRACT

In use, the probe (1) is dropped into a ground-hole (3), for the purpose of detecting the depth of the steel casing (16) of the hole. The probe comprises a long, slim, tubular housing (2) made of stainless steel. Attached inside the housing is a springy stalk (10) made of PVC. The stalk is deflectable laterally, and carries a magnet (11) at its free end. The magnet responds to the steel, and causes the stalk to deflect while in the presence of the steel. The housing, and a stainless steel sleeve (12) around the magnet, comprise a pair of electrical contacts, which break apart and send a signal to the surface when the magnetic influence disappears. The probe is suspended on a cable (4) which is calibrated to indicate the depth of the probe when the signal is received.

4 Claims, 2 Drawing Sheets

PROBE FOR DETECTING THE PRESENCE OF MAGNETIC MATERIAL IN A GROUND HOLE

This invention relates to a probe or detector, of the kind that is used for detecting the presence of magnetic material, such as steel, in a ground-hole.

BACKGROUND TO THE INVENTION

Drilled holes in the ground are used for wells and for many different purposes, including the taking of samples from the ground—when exploring for minerals, for example, or when testing for the presence of contaminants in groundwater.

Such drilled holes are often provided with a steel liner or casing extending through the overburden. Sometimes, the steel liner does not extend to the full depth of the hole, and it becomes important for the engineer to determine to what depth the casing extends.

Previous attempts have been made to provide a probe which can be inserted into the ground-hole, and which will locate the bottom of the casing, and will indicate its depth. The present invention is aimed at providing a probe which is superior in performance and reliability to previous designs, which is quick and easy to deploy and use, yet which is simple and economical to manufacture.

GENERAL DESCRIPTION OF THE INVENTION

The probe of the invention includes a long, slim, housing. Inside the housing is a magnet, and the magnet is mounted for lateral movement, preferably on a springy stalk.

The stalk of the invention is stiff enough to hold the magnet normally in a first position inside the housing.

When the probe is close to steel, the magnet is attracted towards the steel. The stalk of the invention is flexible enough to allow the magnet to move to a second position within the housing, under the influence of the magnetic attraction.

In the invention, the movement of the magnet and of the stalk is utilized to open and close a pair of electrical contacts. The electrical signal from the contacts is received at the surface, and is used to indicate whether the magnet is in its first position or its second position, which in turn indicates whether or not the probe is near steel.

In the invention, the length of the springy stalk extends along the length of the probe. With the stalk placed thus, it is relatively easy for the designer to provide the stalk with the optimum compromise between stiffness and flexibility, against lateral deflection. In the invention, the designer finds it easy to "fine-tune" the amount of sideways deflection the stalk undergoes in response to a lateral force. The fact that the probe is slim, furthermore, means that the stalk does not need to deflect far before it comes into contact with the housing of the probe.

In the invention, the stalk extends along the length of the probe. The designer can arrange (a) that the said first position of the magnet corresponds to the normal or undeflected condition of the stalk, in which the magnet lies suspended in the centre of the housing and (b) that the second position of the magnet occurs when the stalk deflects sideways, i.e. laterally with respect to the length of the stalk.

In the invention, the main bulk of the stalk is disposed along the length of the probe, where there is little restriction on the dimensions of the stalk, whereas the deflection or travel of the stalk, i.e. the movement which actuates the electrical contacts, which is only a small dimension, takes place laterally across the probe, where only small dimensions can be accommodated.

Preferably, in the invention, the electrical contacts are normally open, when the probe is not in the presence of magnetic material. When arranged thus, one of the contacts can be the housing and the other contact can be the magnet. The housing in this case must be made of electrically conducting material, although the housing should not be made of magnetic material. Many grades of stainless steel are non-magnetic, and therefore suited to this purpose. Electrically, the housing may be grounded.

Since it is quite difficult to do machining work on magnet steels, it is generally convenient to mount the magnet itself in a sleeve, and to use the sleeve as the actual electrical contact. The signal current then flows through the sleeve, not through the magnet. The sleeve should be non-magnetic, and again stainless steel is a suitable material.

Preferably, the stalk is made of plastic. When plastic, the stalk can be easily engineered to the right characteristics of springiness, and the plastic can be used to insulate the sleeve and the magnet from the housing.

DETAILED DESCRIPTION OF A PREFERRED EMBODIMENT OF THE INVENTION

The description of the invention will now be further amplified by the description of an example of a probe which embodies the invention. The exemplary probe is shown in the accompanying drawings, in which.

Figure 1:
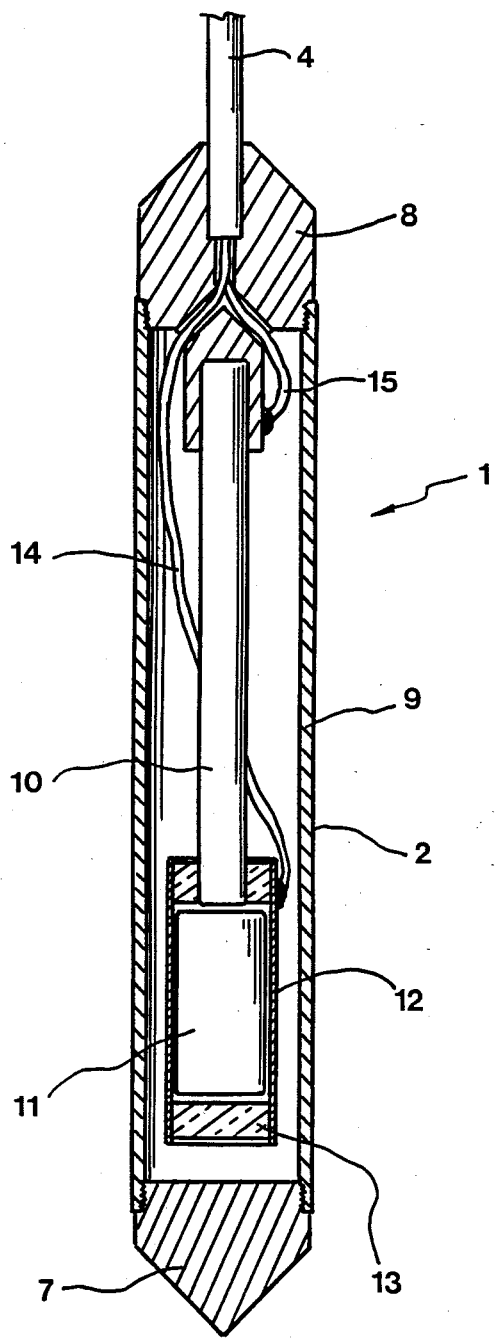
FIG. 1 is a cross-section of the exemplary probe.
Figure 2:
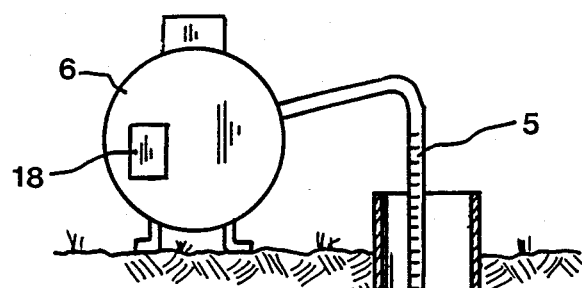
FIG. 2 is a cross-section of a ground-hole, showing the probe of FIG. 1, and its associated sensing apparatus, in use.

The probe 1 shown in FIG. 1 is long and slim and cylindrical, being so shaped and arranged as to be suitable for lowering into a ground-hole 3. The probe 1 is attached to a cable 4. The cable 4 is calibrated along its length, in such a manner that the depth of the probe 1 as it descends into the ground-hole 3 can be determined by reading off the graduations 5 on the cable 4.

The cable 4 is stored on a drum 6, which remains at the surface when the probe 1 is inserted into the hole 3.

The housing 2 of the probe is made of (non-magnetic) stainless steel. The housing includes a nose 7 at the bottom end, a cap 8 at the top, and a tubular portion 9 connecting them.

A stalk 10, made of PVC, is built into the cap 8, encastre-fashion. The stalk 10 lies symmetrically on the axis of the housing. At the lower end of the stalk 10 there is provided a bar-magnet 11. The stalk 10 is so fashioned at its lower end as to receive a stainless steel sleeve 12. The magnet 11 is housed inside the sleeve 12, being held in place inside the sleeve by means of a plug 13.

The stiffness of the stalk 10 is carefully arranged, according to the invention. The stalk 10 is stiff enough that the stalk acts to normally hold the magnet centralised within the housing 2. The stalk is flexible enough, on the other hand, that when the magnet is attracted sideways, the flexibility of the stalk 10 permits the magnet 11 to move laterally, under the magnetic attraction. The magnet is permitted to move laterally far enough that the magnet, or rather the sleeve 12, moves into contact with the housing 2.

Figure 3:
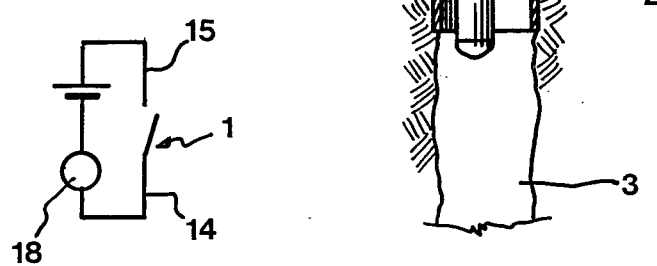
FIG. 3 is a circuit diagram relating to the apparatus of FIG. 2.

The sleeve 12 is connected electrically to a conductor 14. The housing 2 is connected to another conductor 15. These wires are incorporated into the cable 4, and are arranged in the simple circuit shown in FIG. 3. When the sleeve 12 is in contact with the housing 2, the buzzer 18 sounds. When the sleeve 12 is not in contact with the housing 2, the buzzer 18 does not sound. (The buzzer may be replaced by an indicator lamp.)

The housing should be sealed. There is often water present in ground-holes, which must be kept away from the electrical contacts. The probe should be heavy enough to sink in water.

As mentioned, certain dimensions are important in the invention. In the particular exemplary probe of FIG. 1, the following dimensions apply:

diameter of housing: 4 cm;
length of housing: 28 cm;
material of housing: stainless steel;
wall thickness of housing: 0.3 cm;
wall thickness of sleeve: 0.16 cm;
diameter of magnet: 2.22 cm;
length of magnet: 2.5 cm;
diameter of stalk: 0.2 cm;
length of stalk: 3.8 cm;
material of stalk: PVC or nylon.

In use, the probe 1 of the invention is lowered into a ground-hole 3, for the purpose of determining to what depth the metal (steel) casing 16 extends.

As the probe passes down through the casing 16, there is magnetic attraction between the casing 16 and the magnet 11. The magnet moves sideways under the magnetic attraction, deflecting the flexible stalk 10, until the sleeve 12 contacts the housing 2, thus sounding the buzzer 18.

The bottom of the casing 16 is indicated when the buzzer 18 stops sounding, and the amount of cable paid out at that point is read off to indicate the depth.

The invention may also be used to detect the presence of metal rings placed around a PVC hole-liner. Such rings are loose on the liner, and move up and down with settlement of the land. Such rings may be detected magnetically through the PVC, using the probe of the invention.

It may be noted that the magnetic flux passes through the stainless steel housing 2, but is not enough to allow any substantial contact force to develop between the housing and the casing 16. Thus the probe slides smoothly down into the hole, without interference due to the housing sticking to the side wall.

The thickness of the walls of the central portion of the housing must be carefully chosen: if too thick, the magnetic flux passing through the housing would be insufficient to move the magnet; if too thin, the magnet would stick to the casing, which would interfere with the smooth falling of the probe into the hole.

It is recognised in the invention that there are a number of conflicting parameters in the design of the probe that determine whether the probe performs correctly. It is recognised that the design of the probe allows these parameters to be optimised.

In the invention, the stalk must be stiff enough to hold the magnet firmly in the centre of the housing, and to hold the electrical contacts firmly apart. If the stalk were too flexible, the electrical contacts might close due to an accidental knock on the probe, which might easily happen as the probe is being lowered into the ground-hole.

(In fact, some accidental closing of the contacts can be tolerated, for example in the case where the signals are only taken when the probe is stationary in the hole. However, on other occasions it is often required that the probe should indicate accurately the presence of steel when the probe is actually moving in the hole, and in that case there should be no accidental closure of the contacts due to knocks.)

The magnet, in turn, should be strong enough that it can overcome the restoring force of the springy stalk, and can provide a firm, unwavering, electrical contact. Hence the strength of the magnet has to be chosen in relation to the stiffness of the stalk.

On the other hand, the magnet should not be so strong that the magnet causes the probe to stick to the steel casing. The magnetic flux passes through the walls of the housing, and the thickness of the walls is therefore critical in relation to the strength of the magnet. The flux transmitted through the walls of the housing must be such that the magnet responds firmly to the presence of the steel casing, and yet the magnetic attraction must not be too strong. Since the probe is required to operate when there is water in the hole, the strength of the magnet should also take account of the difference in the permeability of water.

Hence, the strength of the magnet, the flexibility (stiffness) of the stalk, and the thickness of the walls of the housing, are all critically inter-related. The invention allows a degree of optimisation of these parameters that has not been possible in previous designs of probe.

The invention makes use of the fact that the probe is long and slim: the invention places the length of the stalk along the length of the probe, which allows the stalk to have a good restoring characteristic, to keep the electrical contacts firmly apart when the magnet is not actuated, and to restore the magnet crisply to the at-rest position when the magnetic influence passes. In the invention, this characteristic is coupled with the reliability that comes from a robust one-piece, no moving-part, component.

It may be noted that the stalk of the invention is mounted encastre-fashion into the housing. When the stalk deflects, therefore, it does so in the cantilever mode. As such, the rate of the deflection is high, i.e. the magnitude of lateral force required to produce a given magnitude of lateral deflection is highly dependent on how far the stalk is already deflected. Also, with a cantilevered stalk, the force tending to restore the magnet and stalk to the at-rest position falls to zero, close to the at-rest position.

It might be thought that a lower-rate characteristic, in conjunction with a detent arrangement, would be more appropriate to the invention. This arrangement, it might be thought, would snap the stalk and magnet back to the at-rest position more positively than is possible with the cantilevered stalk.

However, it is recognised in the invention that the cantilever mounting is the more appropriate. When the magnet is in the at-rest position, the magnet is well-removed from the steel outside the housing, and it is therefore important that the mounting of the magnet allows the magnet, when in the at-rest position, to be very sensitive to weak magnetic forces. Once the magnet has started to move, the magnet approaches the steel, and the magnetic attraction of course becomes stronger.

In the invention, it is recognised that the rate of the stalk should correspond to the "rate" of the magnetic forces. This is not possible to achieve with any accuracy, since the magnetic "rate" follows the inverse-square law, whereas the stalk's rate is linear, but it is recognised in the invention that sufficient correspondence between the two rates can be achieved when the stalk is cantilevered.

The magnet is preferably of the bar-type, and preferably the magnet is placed with its poles one above the other, as shown. A number of magnetic elements may be placed in series in this configuration. Thus placed, the response and sensitivity of the probe are the same in all directions.

In the probe of the invention, there is no complicated procedure on assembly. There are no components to work loose. In the invention, there are no adjustments to be made, and no special setting up required during manufacture.

We claim:

1. Apparatus, which is suitable for detecting the presence of magnetic material in a ground-hole, characterised:

in that the apparatus includes a probe comprising a housing, a magnet, a movable mounting for the magnet, and a pair of electrical contacts;

in that the housing surrounds and encloses the magnet;

in that the movable mounting includes a means for holding the magnet in a first at-rest position, in which the magnet is, in substance, clear of any operative contact with the housing;

in that the movable mounting includes a means for permitting the magnet to move towards the housing to a second position, in response to magnetic attraction between the magnet and steel located outside the housing;

in that the arrangement is such that as the magnet moves between the first and second positions, the electrical contacts change between OFF and ON;

in that the movable mounting includes a spring means for restoring the magnet to the said at-rest position upon removal of the probe from the said steel;

in that the spring means comprises a springy stalk, one end of which is built-into the housing;

in that the magnet is attached to a point on the springy stalk remote from the built-in end;

in that the length of the springy stalk is disposed along the length of the probe;

in that the apparatus includes a suspension means, by means of which the apparatus may be lowered down into the ground-hole, and raised therefrom;

in that the apparatus includes a means for measuring the depth below the ground surface to which the probe has been lowered;

in that the apparatus includes a means for indicating whether the electrical contacts are in the ON or OFF condition, and said indicating mean situated at the ground surface for indicating said condition;

and in that the probe is sealed tight against entry of liquid into the probe, whereby the electrical contacts in the probe are isolated from water present within the ground-hole.

2. Apparatus of claim 1, further characterised:
in that the stalk is made of plastic material.

3. Apparatus of claim 2, further characterised:
in that the magnet is disposed in a sleeve;
in that the sleeve is made of electrically conductive material;
in that the sleeve is not movable with respect to the magnet, and is movable in unison with the magnet;
in that the sleeve comprises one of the pair of electrical contacts;
and in that the housing comprises the other of the pair of electrical contacts.

4. Apparatus of claim 3, further characterised:
in that the housing is made of electrically-conductive and non-magnetic material.

* * * * *